April 28, 1936. S. C. BLISS ET AL 2,038,533
HYDRAULIC SHOCK ABSORBER
Filed Feb. 9, 1933
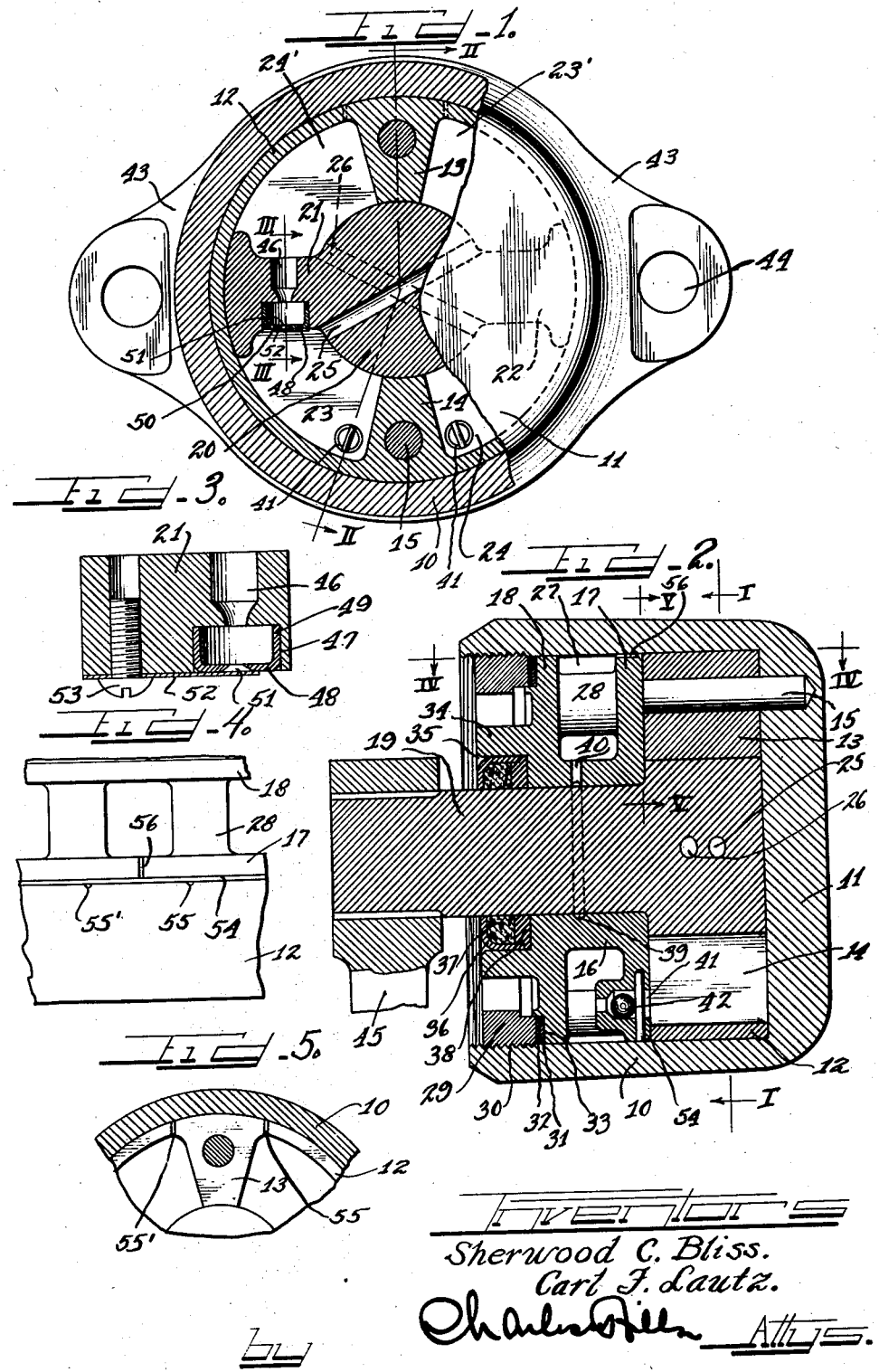
Inventors
Sherwood C. Bliss.
Carl J. Lautz.
by Charles Hill Attys.

Patented Apr. 28, 1936

2,038,533

UNITED STATES PATENT OFFICE 2,038,533

HYDRAULIC SHOCK ABSORBER

Sherwood C. Bliss, Kenmore, and Carl F. Lautz, Buffalo, N. Y., assignors to Houde Engineering Corporation, Buffalo, N. Y., a corporation of New York Application February 9, 1933, Serial No. 655,956

11 Claims. (Cl. 188—89)

This invention relates to hydraulic shock absorbers, particularly to that class of shock absorbers known as the "Houdaille" or rotary type.

The invention is concerned particularly with structures in which the working chambers are flanked by a replenishing chamber and where an annular wall or ring forms the cylindrical wall for the working chamber spaces. The important object of the invention is to provide improved venting arrangement for structures of this type for permitting the escape of air and gases from the upper part of the working chamber to the replenishing chamber and for preventing return flow of air or gases, the arrangement being such that the cost of manufacture may be materially reduced.

On the accompanying drawing is shown a hydraulic shock absorber to which the invention is applied. On the drawing Figure 1 is a front view of a shock absorber with part of the outer frame broken away and the exposed part in section on plane I—I of Figure 2;

Figure 2 is a section on plane II—II of Figure 1;

Figure 3 is an enlarged section on plane III—III of Figure 1;

Figure 4 is a fragmentary view looking from plane IV—IV of Figure 2; and

Figure 5 is a fragmentary sectional view on plane V—V of Figure 2.

The enclosing housing or frame of the structure shown comprises the annular wall 10 and the outer side wall 11 integral therewith, these walls enclosing a cylindrical space. Seated against the wall 11 is an annular cylindrical frame or ring 12 having the partitions or abutments 13 and 14 extending radially inwardly from opposite sides, the ring 12 fitting securely with its outer cylindrical surface against the cylindrical surface within the wall 10. Pins 15 extend through the partitions 13 and 14 and into the wall 11 to secure the frame 12 against rotational movement relative to the annular wall 10.

Within the housing wall 10 and in front of the side wall structure 12 is a frame comprising a hub part 16 and inner and outer end flanges whose peripheral cylindrical faces accurately fit the cylindrical surface within the housing wall 10, the flanges providing respectively the inner side wall 17 and the end wall 18. Extending axially through the hub 16 and journalled therein is a shaft 19 having at its inner end the cylindrical hub 20 from which piston arms or vanes 21 and 22 extend radially in opposite directions, the sides of the hub abutting against the outer side wall 11 and the inner side wall 17 respectively, the hub at its circumference bearing against the inner faces of the partition lugs 13 and 14, the cylindric outer faces of the piston wings bearing against the inner cylindrical face of the ring 12 from which the partition abutments extend. The piston wings and the abutments define high pressure chambers 23 and 23' and low pressure chambers 24 and 24', the high pressure chambers being at all times in communication with each other through a passageway 25 extending diametrally through the hub 20 and the low pressure chambers being always in communication through a similar passageway 26 through the hub.

The walls 17 and 18 are spaced apart to form the sides of a replenishing chamber 27 whose inner wall is formed by the hub 16 and whose outer wall is formed by the housing wall 10, cross walls 28 extending at intervals between the partition walls to strengthen the structure. The end wall 18 is engaged by a ring nut 29 having threaded engagement with the interior threading 30 at the outer end of the housing wall 10, this ring nut securely clamping the structure 16, 17, 18 against the frame 12, 13 to form a tight and secure engagement of the various parts forming the fluid pressure chambers and to prevent leakage during operation of the shock absorber.

Between the inner face of the ring nut and the end wall 18 a rubber packing ring or gasket 31 is inserted with a steel friction washer 32 preferably interposed between the rubber and the face of the ring nut, the wall 18 having the annular recess 33 for receiving the gasket and the washer and the end of the nut, so that when the nut is turned in the threading 30 to clamp the structure 16, 17 and 18, the rubber will, under the pressure, be displaced into firm engagement with the wall 18 and the housing wall 10 to form a perfect seal against the escape of fluid from the replenishing chamber 27.

On its outer side the wall 18 has the annular flange extension 34 of larger inner diameter than that of the shaft 19 to leave a packing pocket 35. A metal retainer 36 of L-shaped cross section has friction fit in this packing pocket, the retainer containing packing material 37 such as cork and engaging with its end against a packing washer 38 of rubber, this packing material intimately engaging the wall 18 and the shaft to prevent leakage to the exterior of the shock absorber of any oil or fluid which may escape through the bearings. In advance of this packing material the bearing hub 16 has the annular recuperating groove 39 connected from its top with the replenishing chamber by a duct 40, this groove or channel receiving any fluid which may be forced by pressure from the pressure or working chamber between the shaft and its bearing 16.

The lower high pressure and low pressure chambers 23 and 24 are each connected with the bottom of the replenishing chamber through a passageway 41 controlled by a check valve such as a ball 42, these valves permitting flow from the replenishing chamber into the pressure chambers but preventing flow in the opposite direction.

On the shock absorber shown, the housing wall 10 at its open end has ears 43 extending radially therefrom and provided with bolt holes 44 whereby the shock absorber body may be secured against the side of the chassis of an automotive vehicle, and the shaft 35 at its outer end has secured thereto an arm 45 which is connected from its outer end, usually by a drag link, with the vehicle axle. During relative movement of the vehicle body and axle, the shaft will be oscillated and its piston wings 21 and 22 swung back and forth between the partition abutments 13 and 14. To gauge and control the bypassage of fluid between the high and low pressure chambers during such movement of the pistons, any suitable valving means may be provided. The metering and valve means shown are substantially the same as disclosed in the application of Ralph F. Peo, Serial No. 650,275, filed January 5, 1933. One of the pistons has the bypassageway 46 therethrough between the high and low pressure chambers 23 and 24', which passageway, at the high pressure chamber end, has the cylindrical pocket 47 for receiving an orifice disc or wall 48 from which extends the cylindrical flange 49 which has friction fit in the pocket 47. The disc has a sharp edge orifice 50 therethrough of a diameter to introduce the desired shock absorbing resistance to the flow of the fluid from the high pressure chambers to the low pressure chambers during the high pressure or rebound stroke of the piston structure when the vehicle frame and axle move away from each other. The orifice being sharp edged, such flow will be uninfluenced by any variations in the viscosity of the fluid. The disc 48 has a larger port or orifice 51 therethrough which is closed by one end of a flap valve 52 during the pressure or rebound stroke of the piston structure, this flap valve being secured at its other end as by means of a screw 53. During the high pressure stroke fluid flow can be only through the more restricted orifice 50, but during the low compression strokes of the piston structure, when the vehicle body and axle move toward each other, the pressure will deflect the valve away from the orifice 51 and fluid can then flow through this orifice and also through the orifice 50 for decreased resistance to the fluid flow. The orifice 51 may also be of the knife edge type so that the flow will be uninfluenced by viscosity variation.

Air and gas may collect at the upper part of the upper working or pressure chambers 23' and 24'. An important feature of the invention is the provision of simple inexpensive means for relieving the working chambers of such gas or air. The inner peripheral edge of the inner side wall 17 is chamfered to form an annular recuperating channel 54. Adjacent to the base of the upper partition lug 13, that is, at the highest point of the working chambers 23' and 24', grooves 55 and 55' are cut in the inner edge of the ring or annular wall 12 for connecting the upper ends of the upper working chambers with recuperating channel 54 which channel is connected with the replenishing chamber 27 by a groove 56 extending across the top of the wall 17 as clearly shown in Figures 2 and 4. This recuperating channel 54 serves also to receive any fluid which may be forced out by the pressure between the piston structure and the working chamber forming walls or between the annular wall 12 and the housing wall 10, such escaped fluid rising in the recuperating channel to flow into the replenishing chamber through the groove or channel 56. During operation of the shock absorber fluid is drawn into the working chambers through the passageways 41 so that the working chambers will always be completely filled with fluid, any surplus fluid being forced out and back to the replenishing chamber through the grooves 55, 55' into the recuperating channel 54 and from there back to the replenishing chamber through the channel 56. Any gas and air flowing through the grooves 55 and 55' to the replenishing chamber cannot return, as these grooves are restricted and always filled with fluid which forms a seal against the return of air or gas to the working chambers. This improved venting arrangement is very simple but efficient and eliminates more complicated and expensive venting structures such as valves, vent plugs, or the like.

We do not desire to be limited to the exact construction, arrangement and operation shown and described, as changes and modifications may be made without departing from the scope of the invention as defined in the appended claims.

We claim as our invention:

1. In a hydraulic shock absorber, the combination of a peripheral wall, inner and outer side walls forming with said peripheral wall a hydraulic working space, a piston operable in said space and dividing said space into upper and lower working chambers, a metered bypassageway for the flow of fluid between said working chambers, an end wall adjacent to said inner side wall forming therewith a replenishing chamber, an outer wall surrounding said peripheral wall and said end and inner side walls, means controlling the flow of fluid from said replenishing chamber to said working chambers, and means forming a venting path from the top of the upper working chamber to the replenishing chamber, said venting means including a venting groove in the inner edge of said peripheral wall and a registering groove in the adjacent edge of said inner side wall.

2. In a hydraulic shock absorber, the combination of a peripheral wall and inner and outer side walls forming therewith a hydraulic fluid containing space, a piston operable in said space and dividing said space into upper and lower working chambers, a metered passageway for the flow of displaced fluid from one working chamber to the other, means forming a replenishing chamber adjacent to said inner side wall, means controlling the flow of fluid from said replenishing chamber to said working chambers, an annular channel formed between the adjacent peripheral corners of said peripheral wall and inner side wall, a groove in the inner edge of said peripheral wall at the top thereof connecting the upper working chamber with said annular channel for the escape thereinto of air or gas collected in said upper working chamber, and a duct through the upper part of said inner side wall connecting said annular channel with said replenishing chamber.

3. In a hydraulic shock absorber, the combination of an annular wall having a partition lug depending radially inwardly, outer and inner side walls and means clamping said walls together to define a hydraulic fluid containing space, a piston structure operable within said space and dividing it into working chambers at opposite sides of said partition lug, means for metering the bypassage flow of fluid from one side of the piston structure to the other during operation thereof, a replenishing chamber formed in said inner side wall, means controlling the flow of fluid from said replenishing chamber to said working chambers, a housing wall intimately surrounding said annular wall and said inner side wall, and means forming a venting path from the upper part of said working chambers to said replenishing chamber for the escape of gas or air from the working chambers, said venting path including grooves across the inner edge of said annular wall and a duct through the top of said inner side wall communicating with said grooves.

4. In a hydraulic shock absorber, the combination of an annular wall having a partition lug depending inwardly therefrom, outer and inner side walls for said annular wall forming therewith a hydraulic fluid containing space, a fluid displacement piston operable within said space and dividing said space into working chambers at opposite sides of said partition lug, a replenishing chamber formed in said inner side wall, means controlling the flow of fluid from said replenishing chamber to said working chambers, an annular housing wall intimately surrounding said working chamber forming walls, an annular recuperating channel formed between the adjacent peripheral corners of said annular wall and said inner side wall, a duct at the top of said inner side wall connecting said recuperating channel with said replenishing chamber, and grooves cut in the inner edge of said annular wall at opposite sides of said partition lug for connecting the tops of the working chambers with said recuperating channel, said grooves and said recuperating channel and said ducts forming a path for the escape of air and gas from the tops of the working chambers to the replenishing chamber and said recuperating channel receiving the fluid escaped from the working chambers and returning it through said duct to the replenishing chamber.

5. In a hydraulic shock absorber, the combination of a cylindrical housing comprising a circumferential wall and an outer side wall, an annular cylindrical wall fitting in said cylindrical housing against said outer side wall, an inner side wall structure fitting in said cylindrical housing against the inner side of said annular wall, a clamping member engaging said housing and said inner side wall structure to cause said annular wall to be clamped between said outer side wall and said inner side wall structure to define a hydraulic fluid working chamber, a piston operable in said working chamber and having a shaft extending through and journalled in said inner side wall structure, said inner side wall structure being hollow to provide a replenishing chamber, means controlling the flow of fluid from said replenishing chamber to the working chamber, means forming a venting path for the escape of air and gas from the upper part of the working chamber to the replenishing chamber, said venting pass including registering ducts in said annular wall and said inner side wall structure.

6. In a hydraulic shock absorber the combination of a cylindrical housing comprising a circumferential wall and an outer side wall, an annular wall fitting in said cylindrical housing against the outer side wall, an inner side wall structure fitting in said cylindrical housing and abutting the inner side of said annular wall, a clamping member engaging said housing and said inner side wall structure for causing said annular wall to be clamped between said inner side wall structure and said outer side wall to define a hydraulic fluid working chamber, a piston operable in said working chamber and having a shaft extending through and journalled in said inner side wall structure, said inner side wall structure being hollow to provide a fluid replenishing chamber, said inner side wall structure having an annular recess in its outer face for receiving the inner end of said clamping member, the peripheral side of said recess being closed by the circumferential wall of said housing, and packing material within said recess having the characteristics of rubber whereby to be extruded under compression into sealing engagement with said inner wall structure and said circumferential housing wall to thereby seal against the escape of fluid from said replenishing chamber.

7. In a hydraulic shock absorber, the combination of a peripheral wall, inner and outer side walls forming with said peripheral wall a hydraulic working chamber, a piston operable in said chamber to displace the hydraulic fluid therein, a metered passageway for the flow of fluid from one side of the piston to the other, an outer wall surrounding said peripheral wall and said inner side wall, means providing a replenishing chamber alongside of said working chamber, and means forming a venting path from the top of said working chamber to the top of said replenishing chamber, said venting means including a venting groove in the inner edge of said peripheral wall and a registering groove in the adjacent edge of said inner side wall.

8. In a hydraulic shock absorber, the combination of a housing comprising a cylindrical wall and an outer side wall, an annular wall fitting in said cylindrical wall against said outer side wall, an inner side wall fitting in said cylindrical wall against the inner side of said annular wall, said side walls and said annular wall defining a hydraulic chamber, a piston operable within said chamber, an end wall fitting within said cylindrical wall, said cylindrical wall and said inner side wall and said end wall defining a replenishing chamber, and means forming a venting path for the escape of air from the upper part of said hydraulic chamber to said replenishing chamber, said venting path including registering ducts in said annular wall and said inner side wall.

9. In a hydraulic shock absorber, the combination of a cylindrical housing comprising a circumferential wall and an outer side wall, a partition structure fitting in said cylindrical housing against said outer side wall, an inner sidewall structure fitting in said cylindrical housing against the inner side of said partition structure, a clamping member threading into said housing and engaging said inner side wall structure to cause said partition structure to be clamped between said outer side wall and said inner side wall structure to define a hydraulic fluid working chamber, a piston operable in said working chamber and having a shaft extending through and journalled in said inner side wall structure, said inner side wall structure being hollow to provide a replenishing chamber, means controlling the flow of fluid from said replenishing chamber to said working chamber, and means forming a venting path for the escape of air and gas from the upper part of said working chamber to the upper part of said replenishing chamber.

10. In a hydraulic shock absorber, the combination of a cylindrical housing comprising a circumferential wall and an outer side wall, an annular cylindrical wall fitting into said cylindrical housing against the outer side wall, an inner side wall structure fitting into said cylindrical housing to be entirely within said housing and engaging against the inner side of said annular wall, a clamping nut having threaded engagement in the end of said housing to abut said inner side wall structure to cause said annular wall to be clamped between said outer side wall and said inner side wall structure to define a hydraulic working chamber, and a piston operable in said working chamber and having a shaft extending through and journalled in said inner side wall structure, said inner side wall structure being hollow to provide a replenishing chamber for supplying fluid to said working chamber.

11. In a hydraulic shock absorber, the combination of a cup shaped housing comprising a circumferential wall and an outer side wall, a partition structure fitting in said housing against said outer side wall, an inner side wall within said circumferential wall engaging against the inner side of said partition structure, an annular nut threading into the open end of said housing against said inner side wall whereby to securely clamp said partition structure between said outer and inner side walls, a piston operable between said side walls and having a shaft journalled in said inner side wall, said inner side wall having an annular recess in its outer face for receiving the inner end of said annular nut, the peripheral side of said recess being closed by the circumferential wall of said housing, packing material at the bottom of said recess, and a washer in the outer part of said recess against which said annular nut abuts, said packing material being adapted to be extruded under compression into sealing engagement with said circumferential wall to thereby seal against the escape of fluid from said housing.

SHERWOOD C. BLISS.
CARL F. LAUTZ.